(12) United States Patent
Cabaniss

(10) Patent No.: US 9,170,152 B2
(45) Date of Patent: Oct. 27, 2015

(54) SYSTEMS AND METHODS FOR RECEIVING OPTICAL PULSES

(75) Inventor: John Cabaniss, Marietta, GA (US)

(73) Assignee: ABLE INSPECTORS, INC., Hilton Head, SC (US)

( * ) Notice: Subject to any disclaimer, the term of this patent is extended or adjusted under 35 U.S.C. 154(b) by 652 days.

(21) Appl. No.: 13/527,155

(22) Filed: Jun. 19, 2012

(65) Prior Publication Data

US 2013/0336646 A1   Dec. 19, 2013

(51) Int. Cl.
| | |
|---|---|
| G02F 1/35 | (2006.01) |
| G01J 3/45 | (2006.01) |
| G01J 3/02 | (2006.01) |
| G01J 3/12 | (2006.01) |
| G01J 3/36 | (2006.01) |

(52) U.S. Cl.
CPC .............. *G01J 3/0237* (2013.01); *G01J 3/027* (2013.01); *G01J 3/0208* (2013.01); *G01J 3/0218* (2013.01); *G01J 3/12* (2013.01); *G01J 3/36* (2013.01)

(58) Field of Classification Search
None
See application file for complete search history.

(56) References Cited

U.S. PATENT DOCUMENTS

| | | | | |
|---|---|---|---|---|
| 5,710,658 | A * | 1/1998 | Jacobson et al. | 359/328 |
| 6,025,911 | A * | 2/2000 | Diddams et al. | 356/450 |
| 8,040,608 | B2 * | 10/2011 | Evans et al. | 359/589 |
| 2002/0057435 | A1 * | 5/2002 | Trebino | 356/450 |
| 2004/0233944 | A1 * | 11/2004 | Dantus et al. | 372/25 |
| 2010/0117009 | A1 | 5/2010 | Moriya et al. | |
| 2010/0231909 | A1 | 9/2010 | Trainer | |
| 2011/0006231 | A1 | 1/2011 | Betzig et al. | |

OTHER PUBLICATIONS

The International Search Report and Written Opinion dated Sep. 25, 2013.

* cited by examiner

*Primary Examiner* — Hemang Sanghavi
(74) *Attorney, Agent, or Firm* — McClure, Qualey & Rodack, LLP

(57) ABSTRACT

Various embodiments for facilitating optical communications utilizing a apparatus are disclosed. One embodiment, among others, is an apparatus that comprises a dispersion element configured to transmit a beam through a plurality of optical paths in a spectral dispersion element to generate a spectrally dispersed beam. The apparatus further comprises a second-harmonic generation (SHG) element integrated into the dispersion element, the SHG element configured to generate second-harmonic light beam from the dispersed beam by splitting the dispersed beam into a plurality of beams, wherein the plurality of beams traverse a common axis. The apparatus further comprises a collimator configured to collimate the second-harmonic light beam over a predetermined path length and a phase decoder configured to receive the collimated beam and measure characteristics associated with the collimated beam.

18 Claims, 7 Drawing Sheets

(TOP VIEW)

FIG. 2 (SIDE VIEW)

FIG. 3 (TOP VIEW)

SYSTEMS AND METHODS FOR RECEIVING OPTICAL PULSES

TECHNICAL FIELD

The present disclosure generally relates to the field of spectroscopy, and, more particularly, to a spectrometer configured to provide spectroscopic angular differentiation of close wavelengths and intensities of electromagnetic radiation.

BACKGROUND

The field of spectroscopy general relates to the measurement of electromagnetic spectra, which may arise from emission or absorption of radiant energy. The field may also relate to an interpretation of the spectra based on common conventions. For example, the use of a spectrometer to analyze burning fuel can reveal the presence of potentially harmful by-products or whether the fuel meets the standards a customer or government has established.

Typically, usable emission spectra are produced when radiant energy from matter, excited by various forms of energy (in this case, light), is passed through a slit and then separated into its various components (wavelengths in the case of light analysis). This may be accomplished with either a semi-transparent prism (a refraction basis of analysis) or with a ruled grating (frequently a crystalline solid, a diffraction basis of analysis). Laser-based spectra analysis is a subset of this general field, where the production of a given wavelength of light is fixed to some known wavelength range and intensity and assigned a nominal expected variance inside of this fixed specification. The energy produced from this fixed source arrives at the spectrometer for analysis. The light may experience absorption or attenuation, from either the object of interest or background interference (from sources of no real interest to the investigators). Spectroscopic measurements of wavelengths and intensities of electromagnetic radiation are made using instruments called spectroscopes, spectrographs, spectrometers, or spectrophotometers.

The interpretation of spectra is more complicated, and chemists have found such an analysis tool to be of great value. In the past, communications companies have used variability in spectra to encode additional information in a single real path length. Normally used in a fiber-based connection across a building, the use of several lasers close in wavelength for increasing the bandwidth of a connection is one mechanism for increasing the bandwidth a system provides.

Conventional spectrometers have not gained wide use in the field of communications for two reasons—either the power consumption exceeds the power available, or the analysis time is unacceptable. Whether based on refraction or diffraction, spectrometers typically include a focusing lens with two optical surfaces, a slit, followed by at least three optical surfaces and frequently more than three optical surfaces. From an engineering standpoint, the additional elements used for traditional spectrometry result in an unacceptable loss of power. Several Fourier and inverse Fourier spectrometers have designs which dramatically reduce the number of elements. However, such spectrometers add analysis time where some applications demand results in real-time. Thus, additional time required to interpret the spectrum into meaningful information can be unacceptable.

SUMMARY

Briefly described, one embodiment, among others, is a method implemented in an optical communication system. The method comprises receiving a light beam emanating from a light source and focusing the light beam to form a focused beam. The method further comprises transmitting the focused beam through a plurality of optical paths in a spectral dispersion element to generate a deviation between phases of the focused beam, collimating the spectrally dispersed beam over a predetermined path length, and receiving the collimated beam at a detection device.

Another embodiment is directed to an apparatus that comprises a dispersion element configured to transmit a beam through a plurality of optical paths in a spectral dispersion element to generate a spectrally dispersed beam. The apparatus further comprises a second-harmonic generation (SHG) element integrated into the dispersion element, the SHG element configured to generate a second-harmonic light beam from the dispersed beam by splitting the dispersed beam into a plurality of beams, wherein the plurality of beams traverse a common axis. The apparatus further comprises a collimator configured to collimate the second-harmonic light beam over a predetermined path length and a phase decoder configured to receive the collimated beam and measure characteristics associated with the collimated beam.

Another embodiment is directed to an apparatus that comprises a first focusing element configured to receive an ultra-fast pulse emanating from a light source to form a focused beam, a dispersion element configured to transmit the focused beam through a plurality of optical paths to generate a spectrally dispersed beam, and a self-referencing element configured to generate a second-harmonic light beam from the spectrally dispersed beam by splitting the spectrally dispersed beam into a plurality of beams, wherein the plurality of beams spatially coincide to form the second-harmonic light beam. The apparatus further comprises a collimator configured to collimate the second-harmonic light beam over a predetermined path length, a second focusing element configured to focus the second-harmonic light, and a detection device configured to receive the focused second-harmonic light beam.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
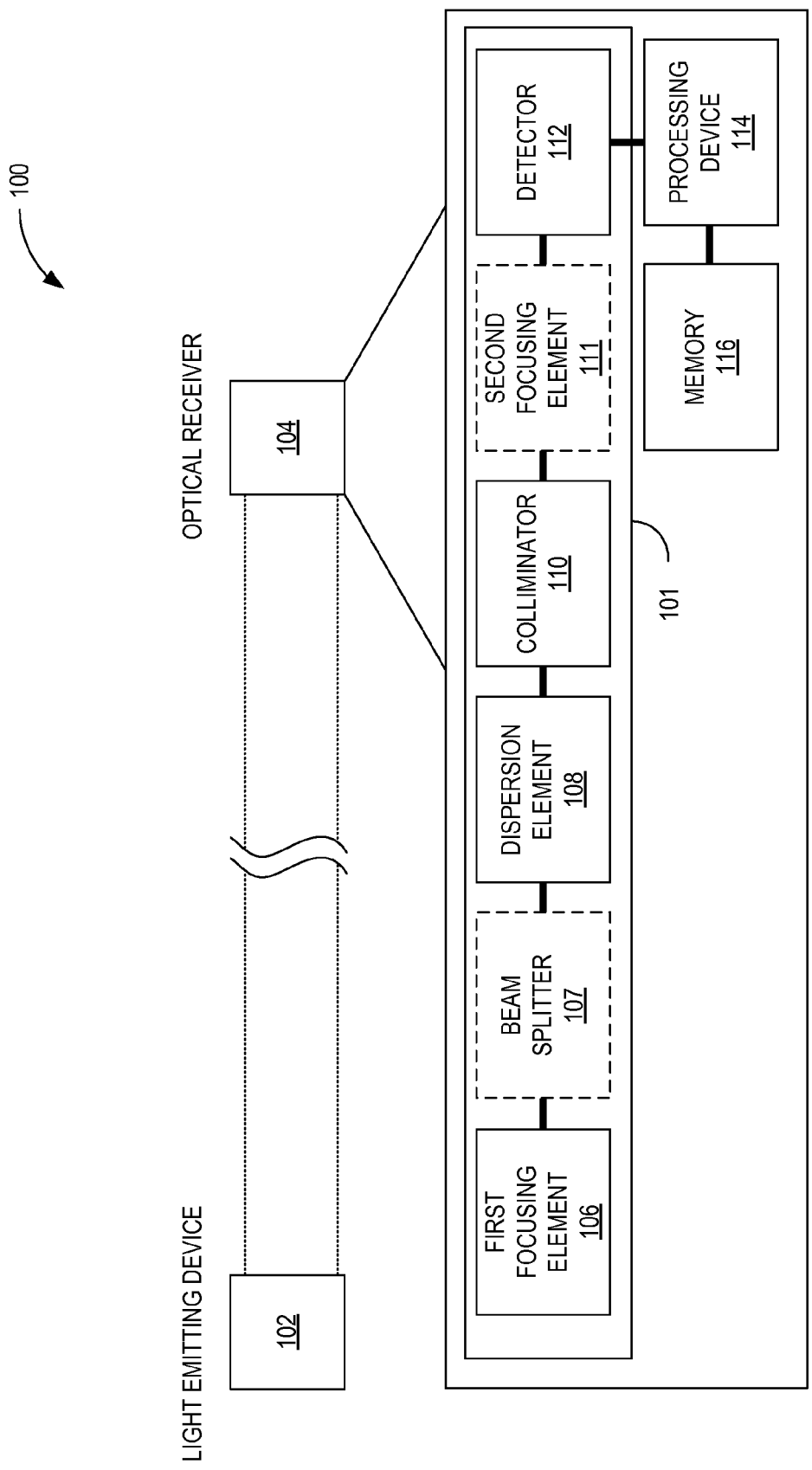
FIG. 1 is a block diagram of an optical communication system in which embodiments of a spectrometer may be utilized for facilitating communications in accordance with various embodiments of the present disclosure.

One approach to laser-based communications systems with multiple wavelengths of lasers transmitting on a single physical path is to utilize narrow-band wavelength filters over physically separated electro-optical materials such as photodiodes. This method is also employed by current manufacturers of laser-based free-space communications, where a fiber is replaced by a physical path through the atmosphere.

Free-space optical communication involves beaming information through the air while facing potential interference from weather as well as physical objects such as birds. However, the wavelength of choice varies in order to balance safety versus sensitivity considerations. The atmosphere has various regions of low attenuation, two of which occur around 800 nanometers (nm) and 1,550 nm. The most sensitive cameras with the highest gain operate in the visible region, which is approximately 800 nm (red to the human eye). However, because this region is visible, the human eye absorbs this light and there are strict power limitations on using this wavelength for communication. Lasers operating at 1,550 nm are allowed to operate at higher power levels, but cameras are not as sensitive at this region. Thus, communications companies must balance such considerations in determining which frequency to utilize.

Various embodiments of an in-line crystal spectrometer are disclosed for providing a physical path deviation based on fine wavelength separations, where the in-line crystal spectrometer can be integrated easily into any communications receiver that uses a line-configuration of electro-optical cells to provide feedback. In accordance with some embodiments, an in-line crystal spectrometer is implemented that eliminates the use of moving parts and many optical surfaces. The spectrometer relies entirely upon the electro-optical properties of the crystal block to control output angles based on wavelength in any arbitrary fixed range.

One embodiment, among others, is a spectrometer that includes a dispersion element configured to transmit a beam through a plurality of optical paths in a spectral dispersion element to generate a spectrally dispersed beam. The spectrometer further includes a second-harmonic generation (SHG) element, which may be integrated into the dispersion element for some implementations of the spectrometer. In accordance with some embodiments, the SHG element is configured to generate a second-harmonic light beam from the dispersed beam by splitting the dispersed beam into a plurality of beams where the plurality of beams traverses a common axis. The spectrometer also includes a collimator configured to collimate the second-harmonic light beam over a predetermined path length. The spectrometer also includes a phase decoder configured to receive the collimated beam and measure characteristics associated with the collimated beam.

As will become apparent to those skilled in the art, embodiments of the spectrometer disclosed herein may be extremely small in size, thereby facilitating the integration of the spectrometer into existing free-space laser-based communications systems as a replacement to current methods of dividing spectral wavelengths through filter systems. Embodiments of the spectrometer as disclosed herein may also be coupled to fiber optical systems.

The encoding scheme utilized in conjunction with the in-line crystal spectrometer is designed for outdoor use and uses a laser with a large bandwidth to transmit information. For some embodiments, a polarization encoding scheme is used to encode information in fiber-optic laser based networks. However, other encoding schemes may be utilized to achieve high bandwidths for pulses under 1 picosecond in duration. In the following discussion, a general description of a system and its components in which the techniques disclosed herein may be implemented is provided, followed by a discussion of the operation of the same.

FIG. 1 is a block diagram of an optical communication system 100 in which embodiments of the spectrometer may be utilized for facilitating communications. As shown, the optical communication system 100 includes a light emitting device 102 that may comprise, for example, a laser source 102 for emitting ultrafast pulses, which generally refer to pulses under 1 picosecond in event duration, or a series a nanosecond lasers that are close in wavelength. The pulses emanating from the laser source 102 are received by an optical receiver 104 configured to process and analyze the received pulses. The optical receiver 104 includes a spectrometer 101 configured to perform spectroscopic angular differentiation of close wavelengths and intensities of electromagnetic radiation using various components.

In accordance with some embodiments, the spectrometer 101 is implemented as an in-line crystal spectrometer that includes four to six elements, two of which are optional components that may be excluded altogether or combined with the focusing element 106 and collimator 110. Depending on the application, the optional components may be incorporated into the focusing element 106 or left as separate elements as the trade between production costs verses available power dictates.

The first element in the optical path of the spectrometer 101 is a first focusing element 106 that exhibits a focusing characteristic and is configured to receive laser-generated light from an independent laser generated source (e.g., from either a free space optical beam emanating from the light emitting device 102 or the output of a fiber optical cable). For some embodiments, the focusing element 106 may be implemented as part of a beam splitter or the dispersion element 108 shown in FIG. 1. In some cases, the necessary degree of focus will be configured by the light emitting device 102 being deployed in the optical communication system 100.

The spectrometer 101 may further comprise a beam splitter 107 configured to split the received beam into two beams that traverse along an axis with a specified crossing occurring inside of the next element. Note that the beam splitter 107 may be integrated into the focusing element 106 or a dispersion element 108, depending on manufacturing abilities. Alternatively, the beam splitter 107 may also be placed before the focusing element 106 in some embodiments.

The dispersion element 108 comprises a block of material, which provides a number of optical paths with equal ordinary lengths and with built-in physical mechanisms for varying the effective length of these paths via a slight alteration of the physical properties of the optical paths within the electro-optic block of material based on frequency (wavelength) of the light which enters the dispersion element 108.

The spectrometer 101 further comprises a collimator 110 configured to compound the spectral dispersion effect created by the dispersion element 108 by adding a path length, thereby allow the beam to propagate a predetermined distance. For some implementations, the collimator 110 may be integrated into the dispersion element 108 or the second focusing element 111, depending on manufacturing abilities.

The second focusing element 111 is configured to either reverse beam splitting geometry as previously employed to stop the beam from deviating further along this axis, or to focus the energy for the detector 112. Finally, the spectrometer 101 includes a detector 112, which may comprise a single detector or a series of detectors (e.g., a camera array) for detecting the output intensity of the light received from the light emitting device 102.

The optical receiver 104 further comprises a processing device 114 configured to further process the information derived by the spectrometer 101 and may perform such operations as phase decoding of pulses received from the light emitting device 102. For example, the processing device 114 may be configured to perform such processing as phase decoding or demodulation of on/off keyed (OOK) signals. The processing device 114 may be coupled to a memory 116 via a local interface, where the memory 116 may include both volatile and nonvolatile memory and data storage components. The memory 116 may store both data and components that are executable by the processing device 114.

Having described the different elements that comprise a spectrometer 101 in accordance with the present disclosure, various embodiments are now described. In a first embodiment, the spectrometer 101 may comprise the (first) focusing element 106, the dispersion element 108, the collimator 110, and the detector 112, where the beam splitter 107 and the second focusing element 111 are optional components and are denoted by the dashed lines shown in FIG. 1. This configuration represents a baseline configuration. In accordance with such embodiments, the (first) focusing element 106 is configured to focus electromagnetic radiation emanating from the light emitting device 102 at or very near to the dispersion element 108.

The collimator 110 is configured to collimate the light into a near-beam to allow the light to propagate and still be captured by the detector 112, which may be embodied as, for example, a camera or other capturing device. For some embodiments, the necessary degree of focus is provided by the light emitting device 102 and thus, an actual element is inserted in place of the focusing element 106 which performs the focusing function. For some applications, this configuration is desirable as this configuration removes the need for an additional optical surface.

For various embodiments, the dispersion element 108 may be constructed of a material which is semi-transparent to the extent possible inside the wavelength range of the communications laser. The material typically comprises a rectangular block with a single preferred ordinary optical path and which defines a series of optical paths with a very slight variation based upon wavelength when one considers the extraordinary optical path. For example, the material may comprise a crystalline substance.

By focusing all light to be evaluated, the light of a specific wavelength will share a uniform deviation with regard to the particular wavelength or frequency of the spectrum in order to achieve spectral dispersion. This angular deviation is actually a combination effect where all physical objects have some non-smooth nature at the atomic level which creates a very weak diffraction effect. All elements have some variability with regard to index of refraction and specific wavelengths, albeit also a very weak effect.

Note that with most crystals, this very slight deviation will occur only with polarized light, but will consistently occur inside of the dispersion element 108 and is generally not considered useful when dealing with light or emissions that are not man-made and could contain any polarization state. The spectral dispersion effect of the dispersion element 108 is compounded by adding a path length after this component. The small angular deviations are exaggerated by allowing the beam to further propagate for some fixed distance before capturing the light and evaluation based on frequencies. For some embodiments, the capturing operation performed by the detector 112 will preferably be shaped in a line. As the angular deviations will be consistent for each portion of light across the axis of preferred spectral dispersion, the elements of the light will become clustered with regard to wavelength in one of several different positions, all along a single physical axis.

Figure 2:
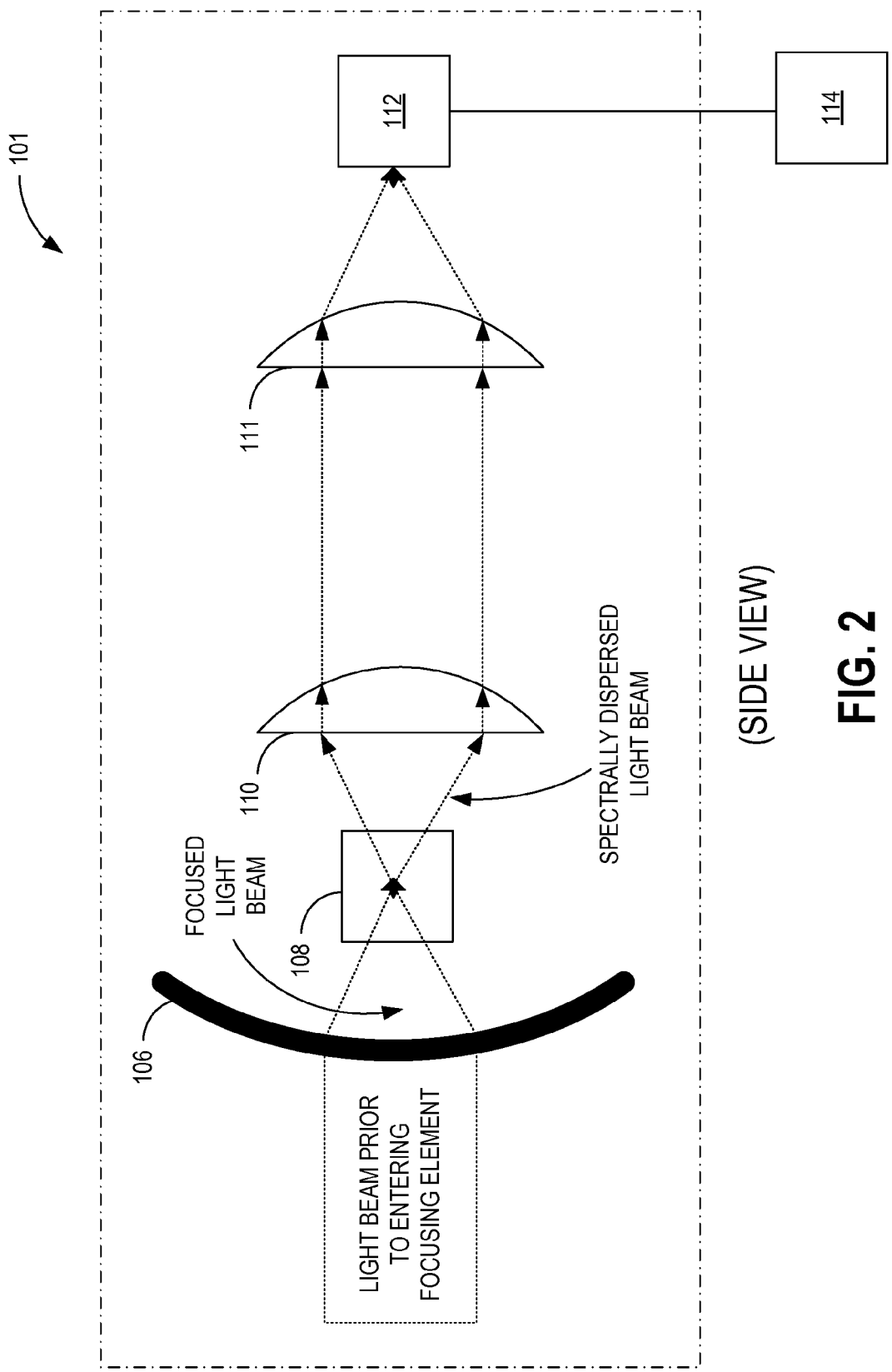
FIG. 2 illustrates a side view of the spectrometer in operation, as used in the optical communication system of FIG. 1 in accordance with various embodiments of the present disclosure.

Reference is made to FIG. 2, which illustrates the operation of the spectrometer 101 in the optical communication system 100 of FIG. 1 without a Fresnel-type optical element. In particular, FIG. 2 provides a side view of the various optical elements of the spectrometer 101 in operation. As shown, a beam received from the light emitting device 102 (FIG. 1) is received by the first focusing element 106. The focusing element 106 focuses the light beam within the dispersion element 108. The spectrally dispersed light beam at the output of the dispersion element 108 is initially spread along two axes before entering the collimator 110. Within the collimator 110, the light beam becomes collimated for a given distance. The collimated light beam then enters the second focusing element 111, which re-focuses the light beam onto the detector 112, which may comprise, for example, a camera array.

Figure 3:
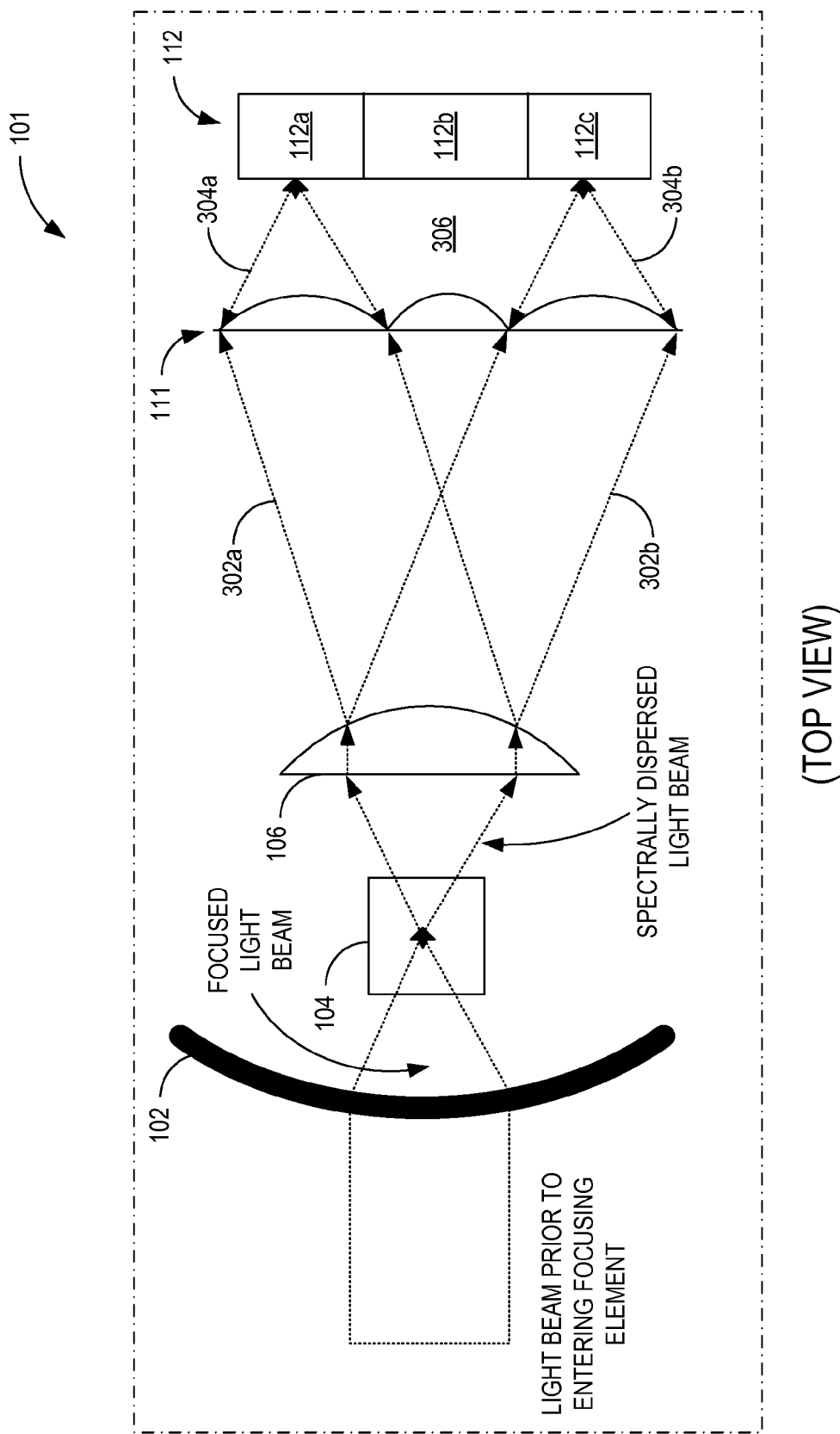
FIG. 3 illustrates a top view of the spectrometer in operation, as used in the optical communication system of FIG. 1 in accordance with various embodiments of the present disclosure.

FIG. 3 illustrates a top view of the operation of the spectrometer 101 in the optical communication system 100 of FIG. 1 without a Fresnel-type optical element in accordance with various embodiments of the present disclosure. Only the lower wavelength 302a and the upper wavelength 302b of the wavelengths of interest are shown, though the wavelengths of interest theoretically have an unlimited number of divisions. The collimator 110 (FIG. 1) is sufficiently spaced apart from the second focusing element 111 to be captured by the second focusing element 111, which may be implemented as a single focusing element or as series of small focusing elements (as depicted in FIG. 3). Elements 304a, 304b illustrate the focusing effect of two wavelengths of interest into the detector 112 (e.g., a camera array) with each detector element 112a, 112b, 112c configured for a particular wavelength. Element 306 represents an unlimited number of elements in between the lower 302a and upper wavelengths 302b of interest.

Figure 4:
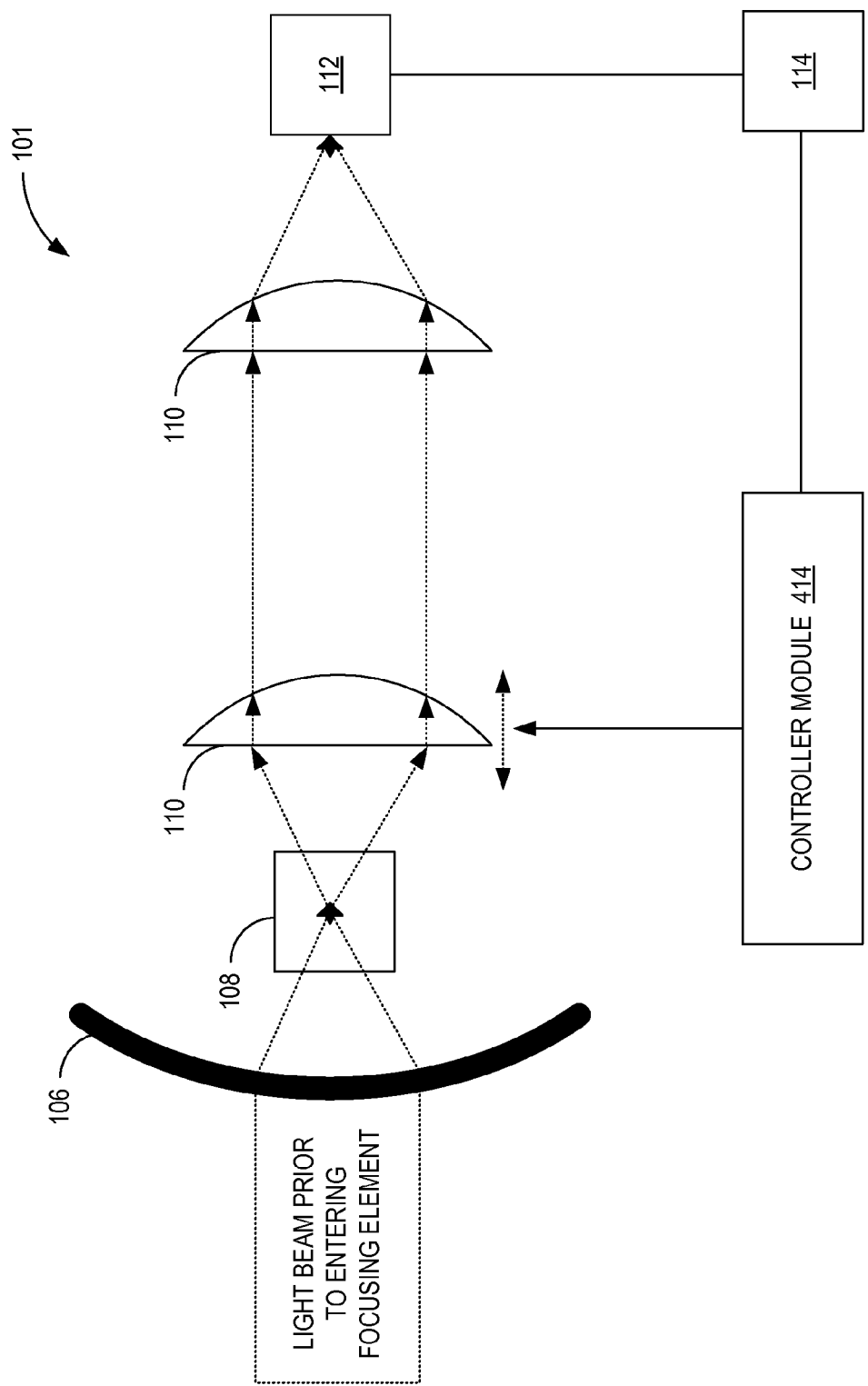
FIG. 4 illustrates an alternative embodiment of the optical communication system of FIG. 1 in accordance with various embodiments of the present disclosure.

FIG. 4 illustrates an alternative embodiment of the optical communication system 100 of FIG. 1 in accordance with various embodiments of the present disclosure. In accordance with some embodiments, a controller module 414 may be implemented in the optical receiver 104 (FIG. 1), whereby the position of the collimator 110 may be dynamically adjusted. While it is generally desirable to minimize moving parts within the optical receiver 104, for some applications, it may be useful to adjust the focal point in order to control the number of channels received by the detector 112. As shown, the controller module 414 for the collimator 110 may be coupled to and controlled by the processing device 114.

In particular, this variability allows for the number of channels to be changed interactively. For system stability, the collimator 110 should generally be kept in a static position. For the detector 112, it may also be more economical to implement this element as either an interchangeable camera or photo diode array as opposed to a collection system with more pixels than are generally used. In accordance with some embodiments, the collimator 110 and the detector 112 may be implemented as an interchangeable pair. Furthermore, more "folding" layers may be added to the optical path, thereby allowing for further beam propagation and ultimately achieving finer detail.

An equation that represent the increased sensitivity is a derivation of the classic dispersing prism equations and is set forth below:

$$\Delta C = l \frac{n_2^2 - \sin^2 \theta_2}{n_1^2 - \sin^2 \theta_1} \qquad \text{Equation (1)}$$

All refractive and dispersing qualities are integrated into the single constant, n, evaluated at two close subdivisions of wavelengths inside the data beam of interest, represented by $n_1$ and $n_2$. The angles that are produced based these same two close wavelengths of interest are correspondingly $\theta_1$ and $\theta_2$. The parameter (l) in the equation above represents the length of physical space traversed, and finally, $\Delta C$ represents the camera spacing that is allowed by this geometry.

For some embodiments, a Fresnel-type element is incorporated into the spectrometer 101. The addition of a Fresnel-type element may be useful, and indeed preferred, in many applications, including those that involve non-linear processes or those that measure ultrafast pulses. Fresnel beam splitters have two planes which converge at a center point, splitting a beam along this center line. Originally used to measure diffraction in an age without modern optical equipment, most equations refer to the diffraction components created by the Fresnel optics. However, the single element utilized in various embodiments takes the place of a set of optical components designed to split the beam and cross it onto itself (or spatially coincide), thereby removing four optical elements from a standard beam splitting geometry and adding a tilt based on the cut of the glass (φ). The dimensions of the fixed Fresnel element can be calculated. Given a beam of spot size S, a distance from the element y, and a center or average wavelength ω, the ideal angle to cut for a design crossing point may be calculated by the following:

$$\varphi = \frac{1}{2} \frac{y}{s} \omega \qquad \text{Equation (2)}$$

Figure 5:
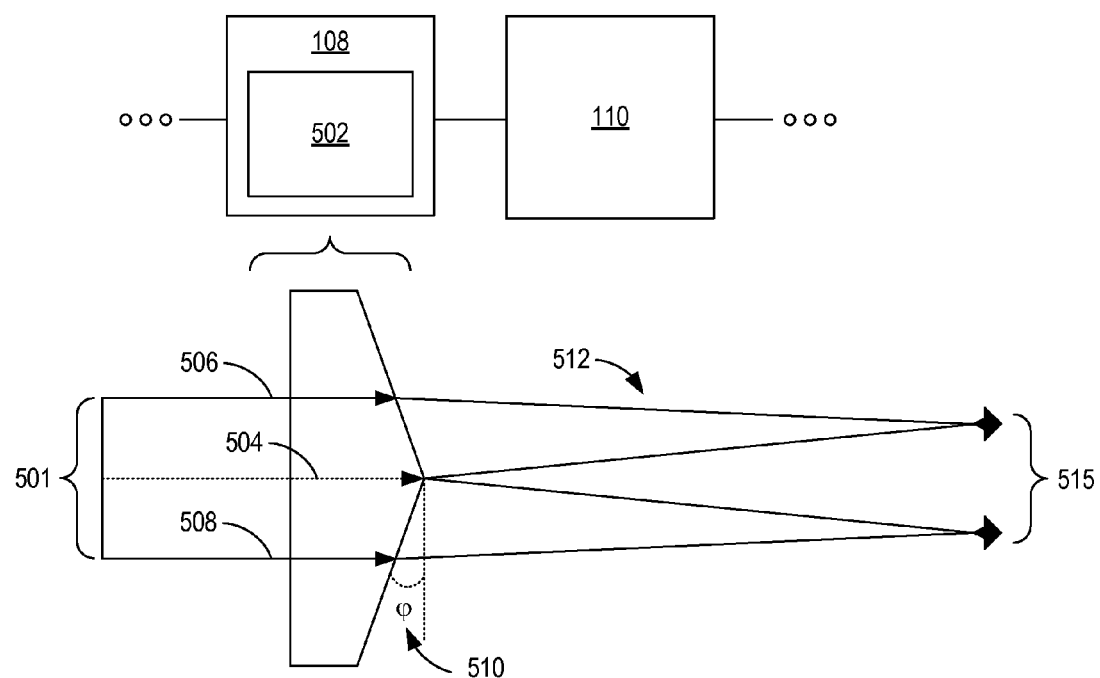
FIG. 5 illustrates an alternative embodiment of the optical communication system of FIG. 1 in which a Fresnel optic is utilized in the spectrometer 101 of FIG. 1.

To further illustrate, reference is made to FIG. 5, which illustrates the use of a Fresnel optic 502 in the spectrometer 101 of FIG. 1. For some embodiments, the Fresnel optic 502 may be coupled to or integrated into the dispersion element 108. As shown, element 501 in the block diagram of the Fresnel optic 502 denotes the length of the spot size of the incoming beam and corresponds to the value S in Equation (1) above. Element 504 corresponds to the new bound created by the Fresnel optic 502 and forms the upper and lower end of the two beams which are produced. Element 506 corresponds to the new upper bound, and element 508 corresponds to the new lower bound. Element 510 denotes the critical angle (φ) formed by the slope of the structure. As shown in Equation 1 above, the critical angle 510 determines the crossing point. Element 512 represents the propagation distance and corresponds to the parameter y inside of Equation 1, and element 515 depicts the crossing point of the beam onto itself and is one half the length of element 501.

Current manufacturing techniques allow for Fresnel beam splitters to be produced independently or to be added to a large number of optical surfaces. Furthermore, current growers of custom crystals can also control the shape of crystal structures so that this element could literally be grown onto the block being used to provide spatial dispersion, thereby changing the block geometry from a rectangle to a composite of solid shapes. Alternately, the focusing element 106 (FIG. 1) before this block could perform this function, thereby resulting in a different element shape and combined function. In this regard, this additional element could be incorporated into two of the four elements disclosed above.

The use of a split beam varies by the application. In general, a beam crossed upon itself (i.e., that spatially coincides) is used to increase the power density, frequently so that a non-linear process can occur where one could not with either independent half, but just as frequently so an additional non-linear process will occur because of the angular difference between the two beams. In the terms of communications, the most important benefit is that these processes occur as part of a self-referencing beam without the need for careful alignment and moving parts. The effect of choice is normally the production of a second-harmonic light generation because it is a relatively high-efficiency process.

Second-harmonic generated light occurs when a molecule absorbs an electromagnetic wave, thereby causing it to oscillate at a given frequency. Before the molecule can re-emit that wave at the same frequency, another electromagnetic wave hits the molecule, causing it to oscillate at a new frequency—the sum of the previous two frequencies. This light is then re-emitted at the sum frequency of the input beams, or in the case where the two beams are the same, at twice the frequency, or one half the input wavelength. Non-linear effects can technically also be used to produce third harmonic generation effects, fourth harmonic generation effects, etc., if desired.

The second-harmonic light beam generated from a pulse interacting with another pulse normally has more degrees of freedom. However, as configured in accordance with various embodiments where the pulse is interacting with another part of itself, given a time delay of (t) and a particular spectral evaluation emerging at an angular deviation of (θ) based on the output of the average of the two effective wavelengths spectral input, the intensity of the second-harmonic generated light based on these two factors (I of θ and t) then becomes the product of both electric fields (E), and takes the form:

$$I(\theta,t) = |\int_{-\infty}^{\infty} E(\tau) E(\tau - t) e^{-i t \theta} dt| \qquad \text{Equation (3)}$$

The generation of second-harmonic generation is of great value for a variety of reasons, principally because such effects occur in real time with a very dramatic effect of lowering the wavelength of the input light by half. This results in light operating at or near 1,550 nm well into the infrared region down to 775 nm well into the visible region for measurement purposes. Notably, in the lower region, current camera technology and sensitivity is vastly more effective.

For free-space optical communications, this combines all the benefits of the two approaches into one additional system capable of being placed into an existing system. Specifically, light is transmitted with a significant improvement in power before undergoing some losses from second-harmonic generation inside of the in-line crystal spectrometer. The light may then be measured by a camera designed to capture light in the 775 nm range, where the camera's increased sensitivity results in a much lower power requirement for a signal to be measured, thereby increasing the overall performance of the communication system.

Figure 6:
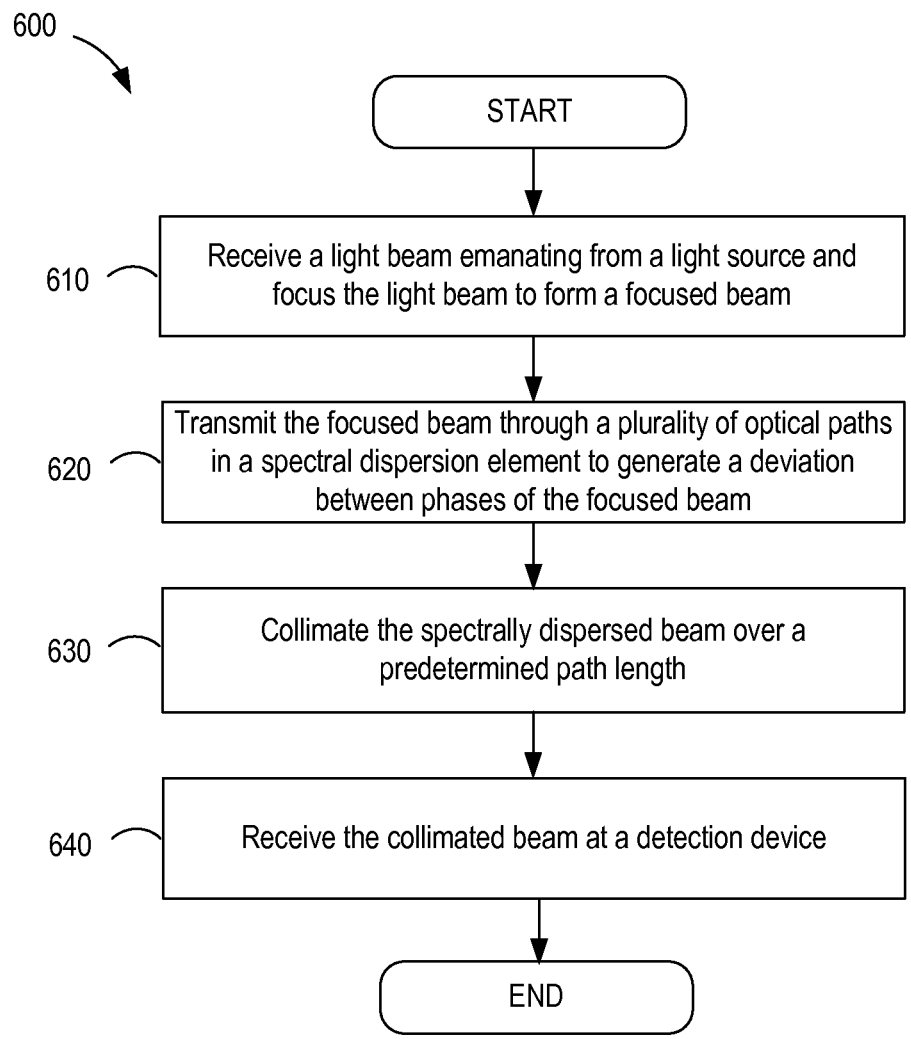
FIG. 6 is a flowchart of a method for facilitating optical communications utilizing the spectrometer in the optical receiver of FIG. 1 according to various embodiments of the present disclosure.

Reference is made to FIG. 6, which is a flowchart 600 in accordance with one embodiment for facilitating optical communications utilizing the spectrometer 101 in the optical receiver 104 (FIG. 1). It is understood that the flowchart 600 of FIG. 6 provides merely an example of the various different types of functional arrangements that may be employed. As an alternative, the flowchart 600 of FIG. 6 may be viewed as depicting an example of steps of a method implemented utilizing the spectrometer 101 according to one or more embodiments.

In accordance with one embodiment for facilitating optical communications, the spectrometer 101 receives a light beam emanating from a light emitting source 102 (FIG. 1) and focuses the light beam to form a focused beam (block 610). For some embodiments, the light beam received from the light source has a wavelength of 1,550 nanometers (nm). In block 620, the spectrometer 101 transmits the focused beam through a plurality of optical paths in a spectral dispersion element to generate a deviation between phases of the focused beam.

For some embodiments, second-harmonic light is generated by the spectrometer 101 whereby second-harmonic generation is leveraged in order to lower the wavelength of the input light by half while also realizing significant power improvement. In block 630, the spectrally dispersed beam is collimated over a predetermined path length, and in block 640, the collimated beam is received at a detection device 112 (FIG. 1) in the spectrometer 101. Thus, for a received light beam operating at or near 1,550 nm, the use of second-harmonic generation allows the detector 112 to perform measurements at or near 775 nm, which falls well within the visible range. Furthermore, a significant increase in the available power is measured by the detector 112.

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted.

Figure 7:
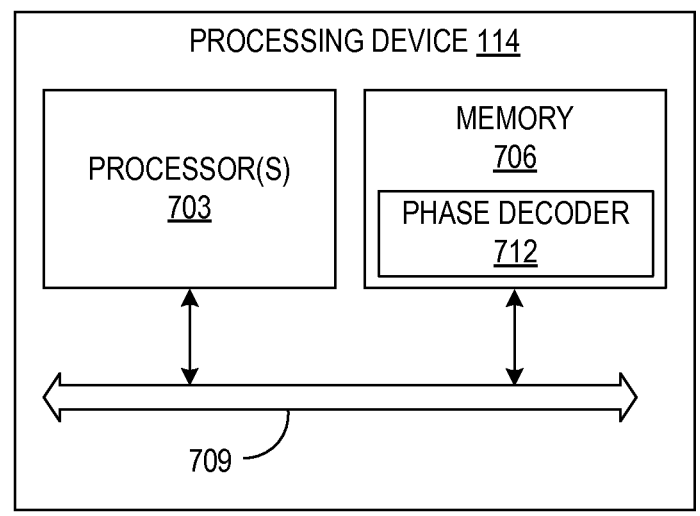
FIG. 7 is a schematic block diagram of the processing device of FIG. 1 according to various embodiments of the present disclosure.

FIG. 7 is a schematic block diagram of the processing device 114 of FIG. 1 according to various embodiments of the present disclosure. As described earlier, the processing device 114 is configured to process the information derived by the spectrometer 101 (FIG. 1) and may perform such operations as phase decoding of pulses received from the light emitting device 102 (FIG. 1). For example, the processing device 114 may be configured to perform such processing as phase decoding or demodulation of on/off keyed (OOK) signals.

In accordance with some embodiments, the processing device 114 includes a processor 703 and a memory 706 that are coupled to a local interface 709. The processing device 114 may comprise, for example, at least one computing device or like device. The local interface 709 may comprise, for example, a data bus with an accompanying address/control bus or other bus structure as can be appreciated.

The processing device 114 may be implemented as a board level product, as a single chip, application specific integrated circuit (ASIC), and so on. Alternatively, certain aspects of the present invention are implemented as firmware. Stored in the memory 706 are both data and several components that are executable by the processor 703 including, for example, a phase decoder 712. It is understood that there may be other systems that are stored in the memory 706 and are executable by the processor 703 as can be appreciated. A number of software components are stored in the memory 706 and are executable by the processor 703. In this respect, the term "executable" means a program file that is in a form that can ultimately be run by the processor 703.

Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), and/or other memory components, or a combination of any two or more of these memory components. In addition, the RAM may comprise, for example, static random access memory (SRAM), dynamic random access memory (DRAM), or magnetic random access memory (MRAM) and other such devices.

Although components described herein may be embodied in software or code executed by general purpose hardware as discussed above, as an alternative, the same may also be embodied in dedicated hardware or a combination of software/general purpose hardware and dedicated hardware. If embodied in dedicated hardware, each component may be implemented as a circuit or state machine that employs any one of or a combination of a number of technologies. These technologies may include, but are not limited to, discrete logic circuits having logic gates for implementing various logic functions upon an application of one or more data signals, ASICs having appropriate logic gates, or other components, etc. Such technologies are generally well known by those skilled in the art and, consequently, are not described in detail herein.

Any logic or application described herein that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in an optical communication system, comprising:
   receiving a light beam emanating from a light source and focusing, using a first focusing element, the light beam to form a focused beam;
   transmitting the focused beam through a plurality of optical paths in a spectral dispersion element to generate a spectrally dispersed beam exhibiting a deviation between a plurality of phases of the focused beam;
   collimating the spectrally dispersed beam over a predetermined path length;
   generating a second-harmonic light beam by splitting the focused beam into a plurality of beams, wherein the plurality of beams traverse a common axis;
   focusing, using a second focusing element, the second-harmonic light beam to generate a plurality of signals, wherein the second focusing element comprises a plurality of focusing elements each deriving a signal having a particular wavelength; and
   receiving the derived signals at a detection device comprising a plurality of detector elements, wherein each detector element is configured to receive one of the plurality of signals.

2. The method of claim 1, wherein the light beam comprises laser-generated light output by at least one of: a free space optical beam source or a fiber optical cable.

3. The method of claim 1, wherein the plurality of beams spatially coincide to form the second-harmonic light beam.

4. The method of claim 1, wherein the light beam received from the light source has a wavelength of approximately 1,550 nanometers (nm).

5. The method of claim 4, wherein the wavelength of the light beam received at the detection device has a wavelength of approximately 775 nm.

6. The method of claim 1, wherein splitting the focused beam is performed utilizing a self-referencing free space optical element.

7. The method of claim 6, wherein the self-referencing free space optical element comprises a Fresnel-type optical element.

8. The method of claim 1, wherein generating the second-harmonic light beam is performed prior to collimating the spectrally dispersed beam.

9. The method of claim 1, wherein the spectral dispersion element comprises a semi-transparent, crystalline material, wherein the spectral dispersion element is configured to provide a plurality of optical paths.

10. The method of claim 9, wherein the spectral dispersion element comprises an electro-optical element configured to control output angles as a function of wavelength.

11. An apparatus, comprising:
   a first focusing element configured to receive laser-generated light emanating from a light source to form a focused beam;
   a dispersion element configured to transmit focused beam through a plurality of optical paths in a spectral dispersion element to generate a spectrally dispersed beam;
   a second-harmonic generation (SHG) element integrated into the dispersion element, the SHG element configured to generate a second-harmonic light beam from the dispersed beam by splitting the dispersed beam into a plurality of beams, wherein the plurality of beams traverse a common axis;
   a collimator configured to collimate the second-harmonic light beam over a predetermined path length;
   a second focusing element configured to focus the collimated second-harmonic light beam to generate a plurality of signals, wherein the second focusing element comprises a plurality of focusing elements each deriving a signal having a particular wavelength;
   a phase decoder configured to receive the derived signals and measure characteristics associated with the derived signals, wherein the phase decoder comprises a plurality of detector elements, wherein each detector element is configured to receive one of the plurality of signals.

12. The apparatus of claim 11, wherein the SGH element is configured as a self-referencing element, and wherein the plurality of beams spatially coincide.

13. The apparatus of claim 11, wherein the first focusing element comprises a cylindrical lens configured to form a focused beam along a single axis.

14. The apparatus of claim 11, wherein the SHG element comprises a single optical element.

15. The apparatus of claim 14, wherein the single optical element comprises a Fresnel-type optical element.

16. An apparatus, comprising:
   a first focusing element configured to receive an ultra-fast pulse emanating from a light source to form a focused beam;
   a dispersion element configured to transmit the focused beam through a plurality of optical paths to generate a spectrally dispersed beam;
   a self-referencing element configured to generate a second-harmonic light beam from the spectrally dispersed beam by splitting the spectrally dispersed beam into a plurality of beams, wherein the plurality of beams spatially coincides to form the second-harmonic light beam;
   a collimator configured to collimate the second-harmonic light beam over a predetermined path length;
   a second focusing element configured to focus the second-harmonic light beam to generate a plurality of signals, wherein the second focusing element comprises a plurality of focusing elements each deriving a signal having a particular wavelength; and
   a detection device configured to receive the derived signals, wherein the detection device comprises a plurality of detector elements, wherein each detector element is configured to receive one of the plurality of signals.

17. The apparatus of claim 16, wherein the detection device is configured to detect light with a wavelength of approximately 775 nanometers (nm).

18. The apparatus of claim 16, wherein a crossing point in which the plurality of beams spatially coincide is a function of a slope associated with a surface of the self-referencing element.

* * * * *